United States Patent [19]

Andres et al.

[11] 4,424,509

[45] Jan. 3, 1984

[54] SENSOR ARRANGEMENT TRIGGERABLE BY DECELERATION FORCES

[75] Inventors: Rudolf Andres, Sindelfingen; Holger Seel, Aidlingen, both of Fed. Rep. of Germany

[73] Assignee: Daimler-Benz Aktiengesellschaft, Stuttgart, Fed. Rep. of Germany

[21] Appl. No.: 269,508

[22] Filed: Jun. 1, 1981

[30] Foreign Application Priority Data

May 30, 1980 [DE] Fed. Rep. of Germany ....... 3020505

[51] Int. Cl.³ ............................................. B60Q 1/00
[52] U.S. Cl. .................................. 340/52 E; 116/203; 116/DIG. 34; 200/61.58 B; 280/806; 307/105 B; 340/61
[58] Field of Search ..................... 340/52 E, 52 H, 61, 340/669; 307/105 B; 280/806; 200/61.58 B; 116/32, 203, DIG. 34

[56] References Cited

U.S. PATENT DOCUMENTS

| | | | |
|---|---|---|---|
| 3,295,101 | 12/1966 | Ellis | 340/669 |
| 3,804,192 | 4/1974 | Takada | 340/52 E X |
| 3,890,594 | 6/1975 | Hosaka et al. | 340/52 H |
| 3,905,440 | 9/1975 | Okada et al. | 340/52 E |
| 3,949,357 | 4/1976 | Hosaka | 340/52 H |
| 4,059,822 | 11/1977 | Toshioka et al. | 340/52 H |
| 4,060,004 | 11/1977 | Scholz et al. | 116/203 X |
| 4,111,459 | 9/1978 | Magyar | 116/203 X |
| 4,273,361 | 6/1981 | Takei et al. | 280/806 X |
| 4,328,976 | 5/1982 | Tsuge et al. | 280/806 |
| 4,359,237 | 11/1982 | Gavagan et al. | 280/806 |

*Primary Examiner*—David L. Trafton
*Assistant Examiner*—Joseph Nowicki
*Attorney, Agent, or Firm*—Craig & Burns

[57] ABSTRACT

A sensor arrangement which is adapted to be triggered by deceleration forces. The sensor arrangement forms a component of a vehicle safety belt system and includes a mass deflectable from an initial position to a deflected position upon exceeding a predetermined deceleration and an indicator which responds if the belt of the safety belt system has been deployed during the occurrence of the predetermined deceleration. The mass is associated with the indicator and has such a mounting and/or includes a track of such an ascending slope, that the full deflection of the mass is attained only beginning at a deceleration of about 2 g. An arrangement is provided for preventing the deflected mass from returning to the initial position.

26 Claims, 11 Drawing Figures

SENSOR ARRANGEMENT TRIGGERABLE BY DECELERATION FORCES

The present invention relates to a sensor arrangement and, more particularly to a sensor forming a part of a safety belt system for motor vehicles, with the sensor being adapted to be triggered by deceleration forces and including a mass which may be deflected or displaced upon exceeding a predetermined deceleration and an indicator means which responds if the belt of the belt system is worn at a time of occurrence of the predetermined deceleration.

A known prior device includes an arrangement wherein a mass responds at a deceleration of about 0.7 g and thereby blocks a reel of a belt roll-up means of a safety belt system. In this device, a shaft accommodating the reel of the belt roll-up means includes a deformable central zone of a bearing flange so that, in case of a relatively high tensile load on the belt strap of the belt system, the belt strap is blocked in an extracted position occupied at that given point in time. The blocking of the belt strap already takes place at a belt load lying markedly below a limit or critical load so that the belt, with a corresponding reduction in comfort, can still be utilized.

Since it is possible to reach a response or threshold value of the inner mass of about 0.7 g by, for example, a sharp braking action of the motor vehicle, it is thus also possible, in a relatively simple manner, to subsequently apply a load to the belt of the safety belt system, of the above-noted device, while retaining the roller blocking effect which occurs during the sharp braking, with this subsequent load leading to a deformation of the bearing flanges and thus to a blockage of the belt strap. Previously, there has been no indication of interest with a high degree of proof, for, for example, by experts such as medical examiners and insurance companies, a determination of the fact as to whether a safety belt had actually been applied during an occassion of a collison of the motor vehicle.

The aim underlying the present invention essentially resides in providing an indicator arrangement cooperable with a sensor triggerable by deceleration forces. The indicator may be manipulated only when a relatively high predetermined amount of force has triggered the indicator, thereby permitting the assumption with a high degree of probability that the safety belt was worn or deployed during a preceding collison of the motor vehicle.

In accordance with advantageous features of the present invention, a sensor arrangement is provided which constitutes a component of the safety belt system and includes a mass which is deflectable upon exceeding a predetermined deceleration. An indicator is provided which responds if the belt is deployed during an occurrence of deceleration which is at or exceeds the predetermined rate. The inert mass associated with the indicator has such a mounting, and/or a track of such an ascending slope, that the full deflection is attained only starting with a deceleration of about 2 g, and means are provided for preventing the deflected mass from returning to its initial position.

By virtue of the above-noted features of the present invention, such a high deceleration force is required, which forces cannot be obtained by a braking maneuver, so that only experts with an in-depth knowledge of the device would be capable of conducting a corresponding manipulation without damage.

Advantageously, in accordance with the present invention, the inert mass may be fashioned as a rolling body such as, for example, a ball and, advantageously, the indicator may represent an electrical or electronic component to which is transmitted, during a deflection of the inert mass, permanent information which may then subsequently read off or read out therefrom.

Advantageously, in accordance with further features of the present invention, the inert mass may be biased by a spring connected to an electrical wire wherein contact takes place through the spring when the mass is deflected into electrical connection with prepositioned toroidal-shaped contact thereby causing a grounded fuse to melt if the inserted latch tongue closes a contact arranged in the lock housing of the safety belt system.

A simple mechanical structure which can be quickly tested, includes an inner mass accommodated in a tubular element arranged between a belt mounting point and a cover plate receiving the belt strip, the tubular element adapted to be permanently deformed by belt forces introduced into the mounting point while retaining a position of the deflected mass.

Advantageously, in accordance with further features of the present invention, the inert mass may be a liquid with the tubular element being provided with sealing lips along an inner wall thereof, which sealing lips prevent a back flow of an externally visible liquid when the tubular element has been subjected to a compressed condition.

To provide an easy readability of the indication that the seat belt was worn during the occurrence of a collision, with a ball being arranged as the inert mass, the ball is adapted to leave an externally visible impression during a deformation of the tubular element.

In accordance with still further features of the present invention, especially useful in a static belt system, the inert mass may be located in a lock housing and a latch tongue insertable in the lock housing providing a prerequisite for a possible subsequent response of the indicator. Advantageously, the inert mass may be in the form of a ball located in a depression trough or indentation provided on a base of the belt lock, with the belt lock accommodating the latch tongue through the interposition of a spring loaded ejector. In this connection, a bottom part of the spring loaded ejector, facing the depression trough or indentation prevents the ball from jumping out of its position when the latch tongue is inserted; whereas, if the ball has jumped or has been displaced out of position due to a deceleration, the spring loaded ejector will abut against the ball before locking of the latch tongue has taken place in case of an attempt of a subsequent introduction of the latch tongue.

It is also possible, in accordance with the present invention, with a static belt system for an inert mass in the form of a ball to be arranged in a depression located in a path of a sloping plane, with the depression being arranged at an upper end of a holder supported at the lock housing by way of a spring. Upon the occurrence of a predetermined deceleration the ball will roll to the deepest point of the sloping plane only after a preceding compression of the spring and then prevents, upon a reduction in belt force, a return of the holder into its initial condition due to the supporting effect with respect to the lock housing. By virtue of this arrangement, it can readily be ascertained whether the belt has been deployed and the sensor triggered.

According to the present invention, a lever may be provided which is pivotably supported in the lock housing, and is under a bias of a spring, with one arm of the lever resting on the holder and the other arm of the lever abutting, in case of a downwardly oriented movement of the holder, against an ejector cooperating with the latch tongue, if the latch tongue is in engagement but which will pivot past the ejector if the latch tongue has not been engaged or inserted.

With a sensor having a belt retractor receiving a free end of the belt strap, a simple construction is possible according to the present invention by virtue of an inert mass arranged in front of the belt roll-up or retractor means, which when further extraction of the belt, taking place during the occurrence of a collision of the motor vehicle, is utilized for triggering the indicator. Advantageously, the inert mass may be fashioned as a pendulum which, upon its deflection, pivots an angle or elbow lever having a free end which dips into a guide means having a wedge-like extending guide slot and being tranversed by the belt strap, wherein with full deflection of the pendulum the belt strap is blocked by the jamming free end of the angle lever.

In order to provide for an extremely compact construction wherein a belt retractor is used which receives a free end of the belt strap of the safety belt system and having a locking device arresting the belt reel in case of a predetermined dangerous deceleration, it is advantageous if an unreeling or unwinding of a strap length provides the precondition for a possible subsequent response of the indicator. In this connection, it is suitable to arrange the inert mass so that it rests in a depression during normal driving operation and is maintained under a bias of a spring, with a lever acting on the inert mass, which lever is equipped with a detent tooth. The detent tooth, after a blocking device arrests the reel response, then engages a toothed rim associated with the reel once a feeler or sensor, scanning a coil diameter of the wound up belt strap, has released the lever and the mass lifts from a bottom of the depression due to the effect of centrifugal forces.

In order to preclude a further use of the sensor arrangement of the present invention once the same has been deployed, advantageously, the detent tooth may be supported in the manner of a ratchet so that it can be pivoted away in a belt retraction direction so that when the belt is automatically rolled up it can no longer be extracted.

In order to render manipulation of the sensor arrangement difficult or recognizable, the lever may be equipped with an extension which, when the mass has been deflected, engages in a locking fashion with a securing pin extending into the housing of the belt retractor and through a mounting wall. With the belt not being deployed, it may be possible to dismount the belt retractor and, under certain circumstances, to trigger the indicator, but in such case the securing pin could no longer be introduced.

In all of the above noted constructions of the present invention, it is apparent that the additionally advantageous informative value of being able to ascertain as to whether or not the safety belt had been worn during an impact which generates predetermined forces has been determined by the instant invention. The magnitude of the belt load occurring in case of an impact is recorded by an indicator incorporated into the belt strap and/or by a deformation element interposed, for example, at a mounting point of the belt system.

Accordingly, it is an object of the present invention to provide a sensor arrangement triggerable by a predetermined deceleration force which avoids, by simple means, shortcomings and disadvantages encountered in the prior art.

Another object of the present invention resides in providing a sensor arrangement forming a part of the safety belt system of a motor vehicle which provides an indication as to whether or not the safety belt was worn at the time of occurrence of predetermined decleration forces.

Another object of the present invention resides in providing a sensor arrangement forming a part of a safety belt system for a motor vehicle which is simple in construction and therefore relatively inexpensive to manufacture.

Another object of the present invention resides in providing a safety belt arrangement forming a part of a safety belt system for motor vehicles which includes an indicator means actuable upon the occurrence of predetermined deceleration forces which exceed the deceleration forces normally attained by a braking maneuver of the motor vehicle.

A still further object of the present invention resides in providing a sensor arrangement forming a part of a safety belt system for motor vehicles which provides wifh a high degree of probability a reliable indication as to the use of the safety belt during a collision of the motor vehicle.

Yet another object of the present invention resides in providing a sensor arrangement forming a part of a safety belt system for motor vehicles, adapted to be triggered by predetermined deceleration forces, which functions reliably under all operating conditions.

These and other objects, features, and advantages of the present invention will become more apparent from the following description when taken in connection with the accompanying drawings which show, for the purposes of illustration only, several embodiments in accordance with the present invention, and wherein:

Figure 1:
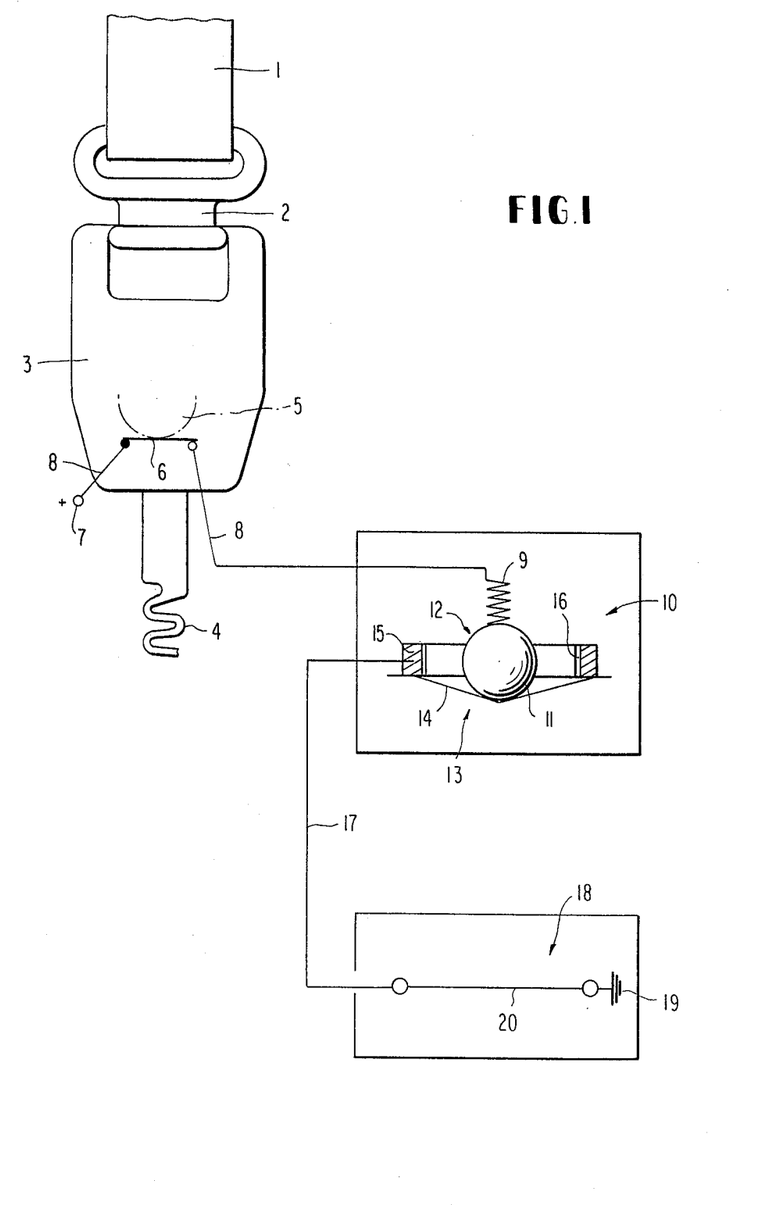
FIG. 1 is a partially schematic view of a first embodiment of a sensor arrangement constructed in accordance with the present invention and provided with a safety fuse as an indicator means.

Referring now to the drawings wherein like reference numerals are used throughout the various view to designate like parts, and, more particularly, to FIG. 1. According to this Figure, a belt strap 1 of a safety belt system is received or accommodated by a latch tongue 2 which is adapted to be inserted into a lock housing 3. The lock housing 3 is fixedly mounted by way of a deformation element 4 to a solid or fixed vehicle part (not shown). In an inserted and latched position of the latch tongue 2, a lower zone 5 of the latch tongue 2, indicated in phantom lines, closes a contact 6 so that a voltage supply to a terminal 7 is applied, through a wire 8, to a spring 9, with the spring 9 acting on a ball 1 forming a component of a sensor generally designated by the reference numeral 10.

The ball 11 acts as an inert mass generally designated by the reference numeral 12 and is adapted to be deflected from a mounting means generally designated by the reference numeral 13 upon an attainment of a predetermined deceleration amounting to about 5 g, rolling upwardly along a sloping track 14 until is abuts against a contact 15 which is preferably generally toroidal-shaped and provided at least with an electrically conductive layer 16. Since the ball 11 consists of an electrically conductive material or has an electrically conductive coating and the track 14 is non-conductive, the ball 11 acts as an electrical contact between the opening 9 and contact 15 wherein the at least partially relaxed spring 9 prevents an interruption of the electrical contacting and thereby insuring a current flow by way of a wire 17 connected to the conductive layer 16 to an indicator generally designated by the reference numeral 18 which is connected to a ground 19. The indicator 18 includes a safety element 20 such as, for example, a fuse or the like which is burned through and destroyed as the current flows from the wire 17 to the ground 19. As a result of the safety element 20 being burned through, a reliable indication is obtained with a high probability of certainty as to whether the safety belt had been worn during a preceding impact or collision of the motor vehicle.

Figure 2:
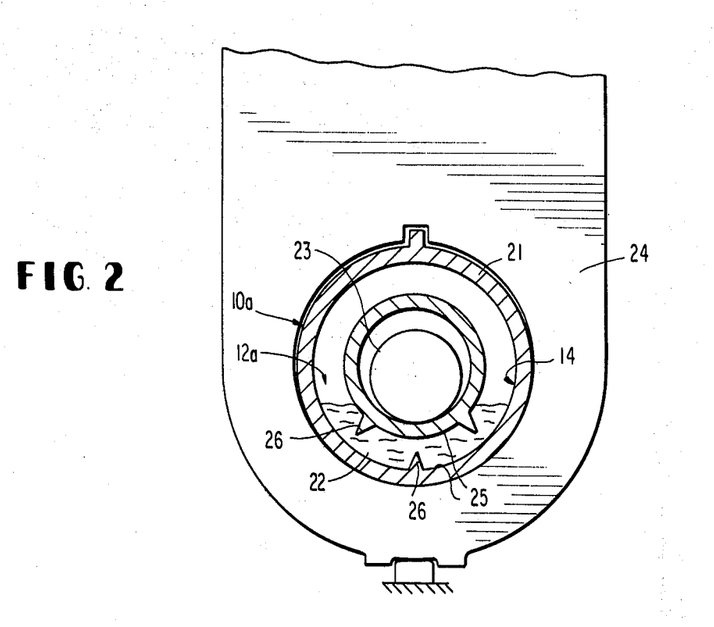
FIG. 2 is a cross sectional view of another embodiment of a sensor arrangement in accordance with the present invention, wherein a sensor means and indicator means are arranged in a zone of a belt mounting point of a safety belt system.

As shown in FIG. 2, a sensor generally designated by the reference numeral 10a is constructed as a tubular element 21 which includes a track or guide generally designated by the reference numeral 14 which extends in a curved and ascending path. The tubular element 21 accommodates a liquid 22 which functions as an inert mass generally designated by the reference 12a. The tubular element is supported on a belt mounting point 23 with a cover plate 24, secured, if necessary, against turning, and having mounted there on a free end of a belt system in a manner not illustrated in detail in the drawings. The cover plate 24 receives the tubular element 21 which tubular element is likewise mounted so that it is, if necessary, secured against turning. Sealing lips 26 project in an alternating fashion from inner walls 25 of the tubular element.

If a predetermined strong deceleration occurs, the liquid 22 moves, depending upon an installation position of the cover plate 24, ascendingly toward one side or the other side. Due to the simultaneously occurring application of strong belt forces, due to deceleration, being introduced by way of the tubular element 21 to the belt mounting point 23, a permanent deformation is imparted into the tubular element 21. During this process of permanent deforming, the sealing lips 26 respectively contact the opposite inner walls 25 and thus prevent a backflow of the liquid 22 into the original position.

If the tubular element 21 is constructed from a transparent material and the liquid 22 is dyed or otherwise colored, a degree of deflection of the liquid can readily be ascertained. However, it is also possible in accordance with the present invention to utilize, in place of a liquid 22 a ball which, for example, leaves an externally visible impression during a deformation of the tubular element 21, the specifics of which will be discussed later.

Figure 3:
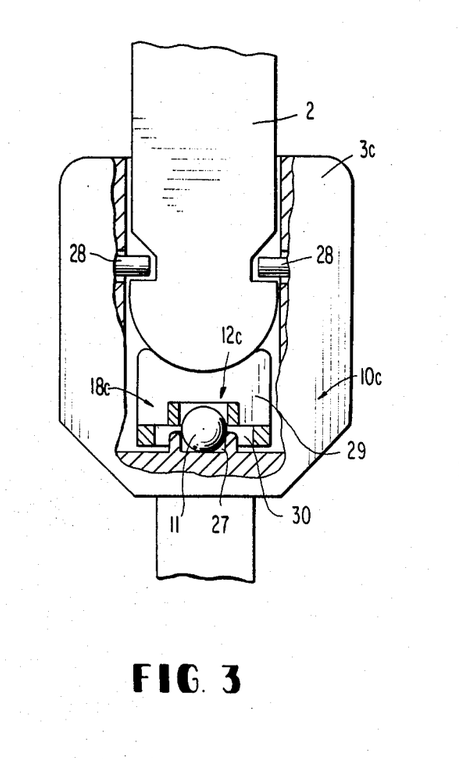
FIG. 3 is a partial cross sectional view of a third embodiment of a sensor arrangement constructed in accordance with the present invention arranged in a lock housing of a belt latch with an inert mass being disposed in a first position.
Figure 4:
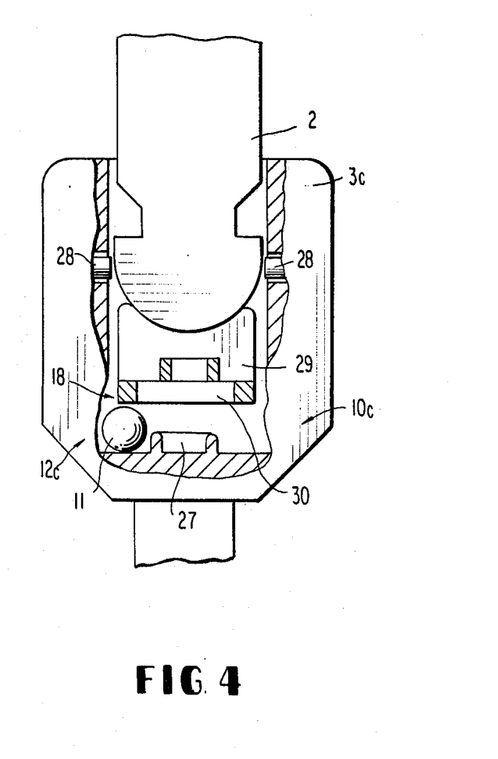
FIG. 4 is a partial cross sectional view of the arrangement of FIG. 3 with the inert mass of the sensor arrangement being disposed in another position.

As shown in FIGS. 3 and 4, a sensor generally designated by the reference numeral 10c may be provided with an indicator generally designated by the reference numeral 18c, with the sensor 10c and indicator 18c being accommodated in a lock housing 3c of a safety belt system not shown in detail. An inert mass generally designated by the reference numeral 12c is fashioned as a ball 11 and, during normal driving, rests in a depression or cavity 27 arranged in a bottom zone of the lock housing 3c. As shown in FIG. 3, a latch tongue 2 is adapted to be inserted into the lock housing 3a and locked in place by pins 28 which, in a manner not illustrated in detail, can be caused to disengage by a conventional release key arranged at the lock housing 3c.

With the latch tongue 2 in the position illustrated in FIG. 3, a lower end of the latch tongue 2 downwardly presses an ejector 29, with the ejector 29 being under the force of at least one spring in a manner not illustrated in the drawings. By a correspondingly fashioned zone 30 of the spring loaded ejector 29, the ball 11 is prevented from leaving the depression 27 even in case of a strong deceleration.

If the latch tongue may be introduced into the lock housing 3 after a collision of the motor vehicle so that the self holding function takes effect, it can be assumed with a high degree of probability that the belt system had been worn during the collision. On the other hand, if the belt system was not worn during the collision, then the ball 11 is capable of leaving the depression 24 upon the occurrence of the predetermined deceleration due to the ejector 29 being connected in front at a spacing therefrom so that the elements assume the position shown in FIG. 4. With the elements positioned in the manner shown in FIG. 4, if an attempt is made to introduce the latch tongue 3, the ejector 29, before locking of the latch tongue 3 has taken place, abuts against the ball 11 and a further use of the safety belt is prevented. Furthermore, in such a case, it can be assumed that the safety belts have not been deployed at the time of impact or collision of the motor vehicle.

Figures 5, 6:
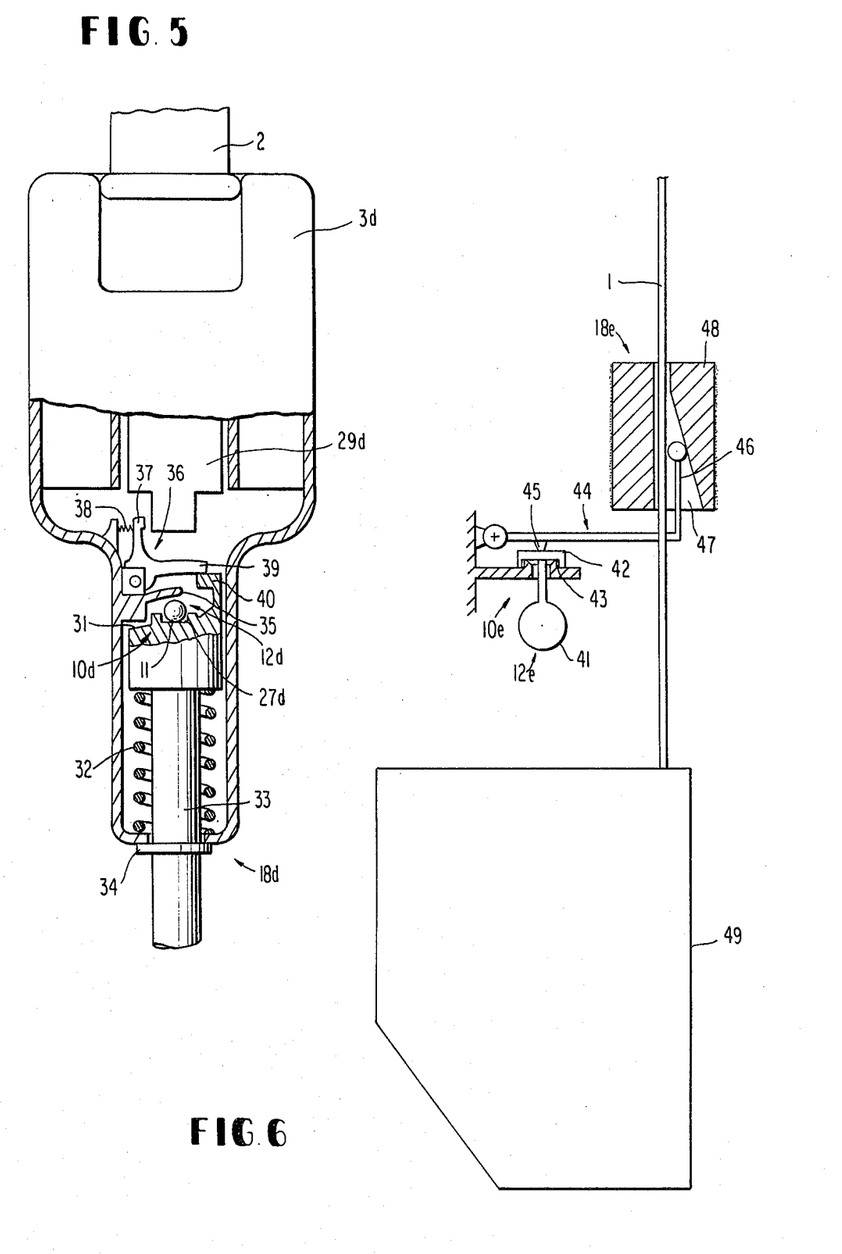
FIG. 5 is a partial cross sectional view of a sensor arrangement similar to the arrangement of FIGS. 3 and 4 showing a preceding belt load as a prerequisite for triggering.
FIG. 6 is a partial schematic cross sectionai view of another embodiment of the present invention wherein a sensor means and indicator means are located forwardly of a belt retractor or roll-up means of a safety belt system.

As shown in FIG. 5, a sensor generally designated by the reference numeral 10d and an indicator generally designated by the reference numeral 18d may be accommodated in a lock housing 3d, with an inert mass generally designated by the reference numeral 12d taking the form of a ball 11 adapted to be accommodated in a depression 27d. A sloping planar surface 31 is arranged on a top side of a holder 33 at a position following the depression 27d. The holder 33 is supported against a lock housing 3d through the interposition of a spring 32. A stop 34 provided on the holder 33 limits a stroke of the spring 32 and assumes a distance from the lock housing 3d if higher belt forces become effective.

A finger 35 projects inwardly from the lock housing 3d at a position beneath an ejector 29d, with the ejector 29d being spring loaded in a manner not shown and preventing the ball 11 from jumping out of the depression 27 during vibrations which normally occur during a driving operation of the motor vehicle. A two armed lever generally designated by the reference numeral 36 is disposed above the finger 35, with one arm 37 of the lever 36 being under the bias of a spring 38 the other arm 39 is urged against a shoulder 40 projecting inwardly from the holder 33.

In the position illustrated in FIG. 5, the latch tongue 2 is inserted and the ejector 29d is in its lower position. If a predetermined deceleration occurs, the ball 11 leaves the associated depression if the lock housing 3 has moved upwardly to a corresponding extent against the bias of the spring 32. The ball 11 rolls to the lower-most point of the sloping plane 31 and is jammed in place at that location toward the lock housing 3 when the belt force decreases and the spring 32 becomes effective. Since now the holder 33 can no longer completely enter, a spacing remains between the stop 34 and the lock housing 3 so that it can be assumed with a high degree of certainty that the belt had been worn during a preceding accident or collision of the motor vehicle.

In the above noted path of motion of the holder 33, the arm 39 in contact with the shoulder 40 initially pivots downwardly until its other arm 37 abuts the ejector 29d. If a strapped in passenger frees himself after the collision by releasing the belt, then the ejector 29 moves upwardly and releases the arm 37 which later thereupon pivots downwardly due to the action of the spring 38. The arm 37 is thereby disposed in a path of movement of the ejector 29d so that further insertion of the latch tongue 2 to a point of achieving a further locking action is no longer possible.

As shown in FIG. 6, a sensor generally designated by the reference numeral 10e includes an inert mass generally designated by the reference numeral 12e in the form of a pendulum 41 having a bearing plate 42 which rests on a fixed rim 43. An indicator generally designated by the reference numeral 18e includes a pivotably mounted angle lever 44 having an extension 45 which presses on the bearing plate 42 and a free angled end 46 which is adapted to dip into a guide slot 47 of a guide 48 which is traversed by a belt strap 1 adapted to be extracted from a retractor 49. A blocking device (not shown) of conventional construction and the belt retractor 49 blocks the reel of the retractor as soon as a deceleration of about 0.5 g occurs. If the deceleration reaches a value effecting a deflection of the pendulum 41, then the bearing plate 42 is tilted and the free end 46 of the angle lever 44 is further moved into the guide slot 47 until the belt strap is stressed. Since, at the same time, due to the so called film reel effect, a limited length of belt strap 1 is stilled pulled out with the reel being blocked, the free end 46 is entrained until the latter jams in the wedge-like converging guide slot 47 with the belt strap 1 so that this circumstance again admits a conclusion that the belt had been deployed.

Figure 7:
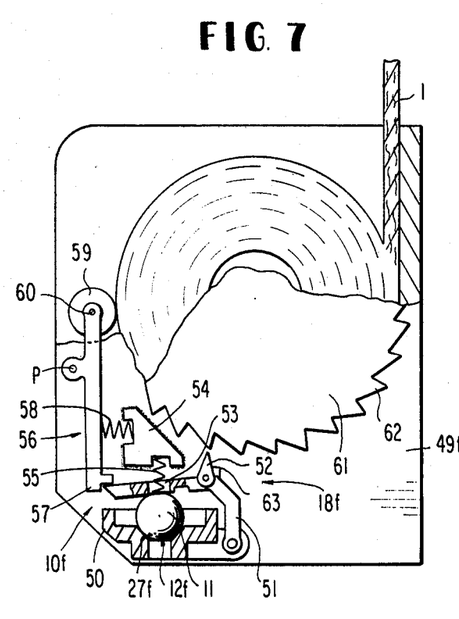
FIG. 7 is a partial cross sectional view of a sensor arrangement constructed in accordance with the present invention integrated into a belt retractor.
Figure 8:
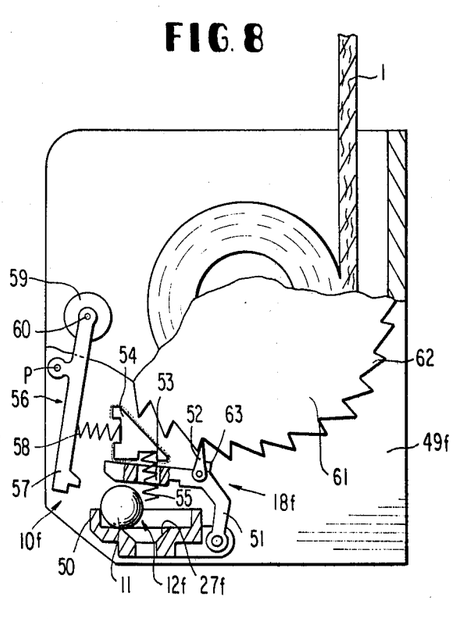
FIG. 8 is a partial cross sectional view of the sensor arrangement of FIG. 7 with components thereof being positioned in a different position.

As shown in FIGS. 7 and 8, a sensor generally designated by the reference numeral 10f and an indicator generally designated by the reference 18f are accommodated in an interior of a schematically illustrated belt retractor 49f. An inert mass generally designated by the reference numeral 12f in the form of a ball 11 rests in a depression 27f defined at a spacing from an annular bead 50. A fixedly mounted lever 51 engages a detent tooth 52 arranged in the manner of a ratchet, with the lever 51 being provided with a cutout 53. A spring 55 supported on a bracket 54 extends through the cutout 53 and acts on the ball 11.

A feeler generally designated by the reference numeral 56 is fashioned as a two armed lever with a lower arm 57 and an upper arm 60 which includes a roller 59 at its distal end. The lever is pivoted as at P and the lever arm 57 is urged outwardly by a spring 58 resting on a bracket 54 in such a manner that a roller member 59 at the end of the upper arm 60 of the feeler 56 is in contact with the belt strap 1 coiled on a reel 61. The lower arm 57 of the feeler 56 has protruding means which engages and depresses the lever 51 during normal driving of the motor vehicle.

As shown in FIG. 8, the feeler 56 pivots aside and releases the lever 51 when the belt strap 1 is unwound during application of the safety belt due to the diminishing diameter of the belt on the reel occassioned by the retraction of the belt. If upon reaching a predetermined deceleration, the ball 11 is deflected, the detent tooth 52 meshes with a toothed rim 62 which may, for example, form a marginal zone of the reel 61. At this point in time, a blocking device (not shown) of conventional construction which responds as early as a deceleration of about 0.5 g, blocks the reel 61. Once the ball 11 is deflected, as seen in FIG. 8, it is precluded from returning to depression 27f by the extension of spring 55.

If after an accident or collision of a motor vehicle, the belt is released, the belt strap is automatically wound up since the detent tooth 52 resiliently yields in the manner of a ratchet. However, if an attempt is made to again unreel a length of belt strap 1, then the detent tooth 52 comes into contact with a stop 63 and blocks the toothed rim 62. In this manner by simply exerting a pull on the belt strap, a determination can be made as to whether the belt strap had been applied at the time of the preceding accident or whether such application was neglected.

Figure 9:
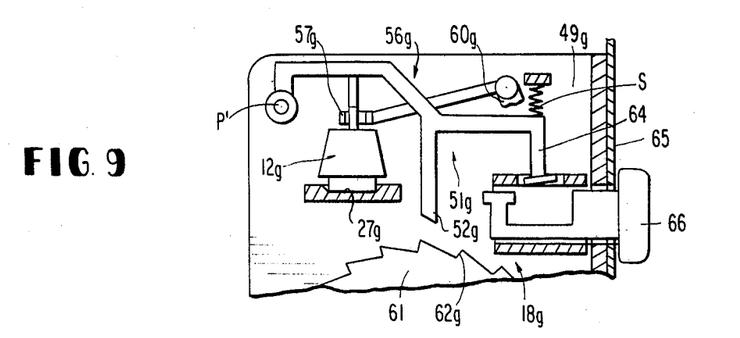
FIG. 9 is a partially schematic cross sectional view of still another sensor arrangement constructed in accordance with the present invention wherein a sensor means and indicator means are accommodated in a belt retraction device and wherein a manipulation is precluded by an additionally provided securing pin.
Figure 10:
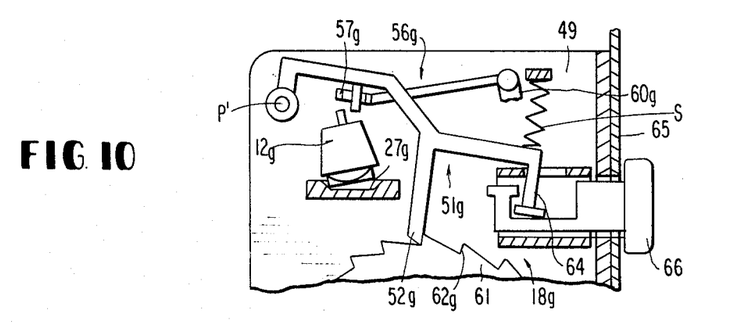
FIG. 10 is a partially schematic cross sectional view of the sensor arrangement of FIG. 9 with the components thereof in a different position.

The construction of FIGS. 9 and 10 apart from a few small structural differences, essentially corresponds to the arrangement of FIGS. 7 and 8 with respect to its basic features. For the sake of clarity, an arm 60g adapted to sense the diameter of the coil of the belt strap present on the reel 61 is merely schematically indicated. In the construction of FIGS. 9 and 10, the inert mass generally designated by the reference numeral 12g rests, during normal driving operation, in a depression 27g and is held in position by a spring loaded lever generally designated by the reference numeral 51g which is pivoted about P'. The lever 51g is provided with an extension 64 projecting in a direction of a securing pin 66 extending through a wall of the belt retractor 49 and a mounting wall 65 associated therewith.

An arm 57g of the feeler generally designated by the reference numeral 56g is adapted to release the inert mass 12g as soon as the belt strap is unwound in a manner not illustrated in detail in the drawings. If a deceleration of about 0.5 g occurs in this position, then the inert mass 12g, tilts toward the side permitting extension 64 to be moved downwardly by spring S and thereby engage a detent tooth 52g with and block the toothed rim 62g. At the same time, the extension 64 engages the securing pin 66 with a locking action so that the pin 66 can thereafter no longer be removed and serves as evidence or an indication as to whether or not the safety belt was worn.

If in the condition of the arrangement shown in FIG. 9, the belt retractor 49 is dismounted and the indicator generally designated by the reference 18g is triggered by a manipulation, then the securing pin 66 can no longer be inserted without damage.

Figure 11:
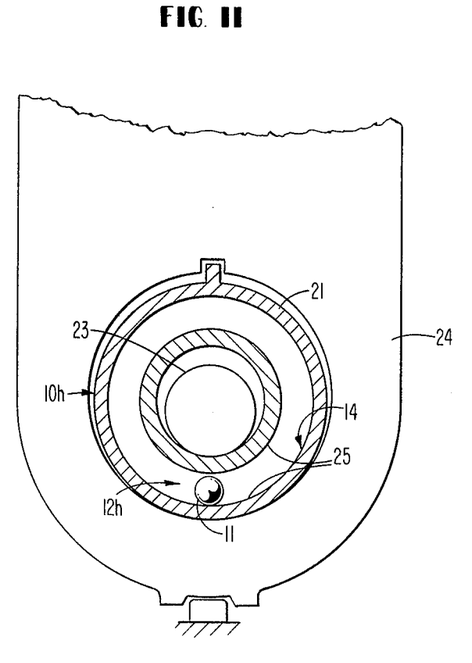
FIG. 11 is a cross sectional view of an embodiment similar to that shown in FIG. 2 wherein another form of the deflectable mass is shown.

As seen in FIG. 11, a sensor generally designated by the reference numeral 10h is constructed as a tubular element 21 which includes a track or guide generally designated by the reference numeral 14 which extends in a curved and ascending path. The tubular element 21 accommodates a ball 11 which functions as an inert mass generally designated by the reference numeral 12h. The tubular element if of the same or similar arrangement to that shown in FIG. 2 wherein the element is supported on a belt mounting point 23 with a cover plate 24, secured, if necessary, against turning, and having mounted thereon a free end of the belt system in a manner not illustrated in detail in the drawings. The cover plate 24 receives the tubular element 21 which tubular element is likewise mounted so that it is, if necessary, secured against turning.

Provided that a deceleration occurs which generates forces of or exceeding a predetermined amount, the ball 11 moves, depending upon an installation position of the cover plate 24, ascendingly toward one side or the other side. In response to the simulataneously occurring application of strong belt forces, due to deceleration, being introduced by way of the tubular element 21 to the belt mounting point 23, a permanent deformation is imparted into the tubular element 21. During this process of permanent deformation, and subsequent to the ball 11 having been deflected, the inner walls 25 will engage the ball element and be deformed therearound giving a positive indication of the position to which the ball had been deflected during deceleration. Accordingly, the degree of deceleration can readily be ascertained.

While we have shown and described several embodiment in accordance with the present invention, it is understood that the same is not limited thereto but is susceptible of numerous changes and modifications as known to one having ordinary skill in the art and we therefore do not wish to be limited to the details shown and described herein, but intend to cover all such modifications as are encompassed by the scope of the appended claims.

We claim:

1. A sensor means adapted to be triggered by deceleration forces and forming a component of a vehicle safety belt system, the sensor means including a mass deflectible from an initial position to a fully deflected position upon exceeding a predetermined amount of deceleration force and an indicator means for providing an indication as to whether the belt of the safety belt system was deployed during an occurrence of a predetermined rate of deceleration characterized in that means are provided for positioning the mass so that a deflection of the mass to the fully deflected position is attained only beginning with a deceleration force of a predetermined amount, and means are provided for controlling the mass in one of said initial position and said deflected position.

2. A sensor means according to claim 1, characterized in that the positioning means includes a guide track having an ascending slope.

3. A sensor means according to claim 2, characterized in that the mass is constructed as a roller body.

4. A sensor means, according to claim 3, characterized in that the roller body is a ball member.

5. A sensor means according to any one of claims 1, 2, or 3, characterized in that the indicator means includes an electronic means adapted to have transmitted thereto, during a deflection of the mass, permanent information which may be read off or read out therefrom.

6. A sensor means according to claim 1, characterized in that the positioning means includes an annular mounting member having a sloping guide track, the mass is accommodated in the mounting member, at least a portion of the mass and mounting member are formed of electrically conductive material, means are provided for electrically connecting the mass to a lock housing of the safety belt system and to an electrical supply, the indicator means includes a fuse element, the controlling means includes a spring means acting on the mass, and in that means are provided for electrically connecting the mounting member and fuse element to a ground so that upon a deflection of the mass an electrical contact between the mounting member and mass is obtained whereby, with a latch tongue of the belt system inserted into the lock housing, electrical current flows from the electrical supply to the ground so as to melt the fuse element.

7. A sensor means according to claim 6, characterized in that the means for electrically connecting the mass to the lock housing and electrical supply includes a switch member controllable by the latch tongue.

8. A sensor means according to claim 1, characterized in that the positioning means includes a tubular element for accommodating the mass, the tubular element is arranged between a belt mounting point and a cover plate secured to the belt in such a manner that the tubular element is permanently deformed while retaining a deflected position of the mass by forces introduced from the belt into the belt mounting point.

9. A sensor means according to claim 8, characterized in that the mass is a liquid, and in that the controlling means includes sealing lips projecting from inner walls of the tubular element, the sealing lips are adapted to prevent a backflow of the liquid from a fully deflected position of the liquid when the tubular element is deformed.

10. A sensor means according to claim 9, characterized in that the tubular element is formed of a transparent material so as to enable a visual determination of a degree of deflection of the liquid.

11. A sensor means according to claim 8, characterized in that the mass is a ball arranged in the tubular element in such a manner that, upon deformation of the tubular element, portions of the tubular element are deformed about the ball means so as to prevent the ball from returning to the initial position and to provide an external visible impression.

12. A sensor means according to claim 1, characterized in that the mass is arranged in a lock housing of the safety belt system, and in that a latch means of the safety belt system is insertable into the lock housing, with a presence or an absence of the latch means providing a condition determining a subsequent response of the indicator means.

13. A sensor means according to claim 12, characterized in that the mass is formed as a ball element, the positioning means includes a depression formed in a bottom portion of the lock housing for accommodating the ball element, the controlling means includes a spring loaded ejector means accommodated in the lock housing for cooperation with the insertable latch means, the spring loaded ejector means includes a bottom portion facing the depression for maintaining the ball element in the depression when the latch means is inserted and for abutting against the ball element in case of an attempt to introduce the latch means into the lock housing after the ball element has been deflected due to the predetermined amount deceleration thereby preventing a locking of the latch means in the lock housing.

14. A sensor means according to claim 12, characterized in that the mass is formed as a ball element, the positioning means includes a holder arranged in the lock housing for movement between an initial position and a displaced position, spring means for biasing the holder in a direction of the latch means, a depression provided in the holder for accommodating the ball element, the controlling means includes an inclined surface portion provided on the holder in an area adjacent the depression, the inclined surface portion being arranged such that, upon occurrence of the predetermined amount deceleration and a compression of the spring means resulting from a movement of the holder, the ball element is deflected out of the depression and rolls to the lowermost part of the inclined surface portion and prevents the holder from returning to the initial position due to a supporting effect of the lock housing.

15. A sensor means according to claim 14, characterized in that means are provided for preventing an insertion of the latch means upon a deflection of the ball element including a multi-armed lever means pivotally mounted in the lock housing, spring means for biasing one arm of the lever means so as to rest against the holder, and for biasing a second arm of the lever means against an ejector means cooperating with an inserted latch means, the lever means being adapted to pivot beyond the ejector means if the latch means was not inserted prior to an occurrence of the predetermined deceleration.

16. A sensor means according to claim 1, characterized in that the belt system includes a belt retractor means accommodating a free end of a belt strap, the mass is connected to a front of the belt retractor means, and in that the retractor means is connected to the indicator means such that an extraction of the belt during a collision triggers the indicator means.

17. A sensor means according to claim 16, characterized in that the mass is formed as a pendulum, the controlling means includes a guide means accommodated in the belt strap, a converging guide slot arranged in the guide means, an angled lever means cooperable with the pendulum and including a free end displaceable in the guide slot, the angled lever means is arranged such that upon a full deflection of the pendulum the free end of the angled lever means is jammed in the guide slot blocking a movement of the belt strap.

18. A sensor means according to claim 1, characterized in that the safety belt system includes a belt retractor means for receiving a free end of the belt strap, and means for blocking the retractor means upon a predetermined amount of deceleration, wherein the retractor means is responsive to the indicator means in a manner precluding unwinding of the belt strap subsequent to an indication by the indicator means.

19. A sensor means according to claim 18, characterized in that the positioning means includes a depression for accommodating the mass, a spring means is provided for holding the mass in the depression, the retractor means includes a reel upon which the belt strap is wound, the controlling means includes a lever means interposed between the mass and a toothed rim of the reel, a detent means is provided on the lever means for engagement with the toothed rim, a feeler means is provided for scanning a diameter of the wound belt strap and for normally blocking the lever means, the lever means and feeler means are arranged such that the feeler means releases the lever means upon a diameter of the belt strap reaching a predetermined diameter and upon an occurrence of the predetermined deceleration whereby the mass is deflected out of the depression by centrifugal force.

20. A sensor means according to claim 19, characterized in that the detent means is a detent tooth cooperable with the toothed rim and mounted on the lever means so as to be pivotable away in a belt retraction direction in the manner of a ratchet.

21. A sensor means according to claim 18, characterized in that the positioning means includes a depression for accommodating the mass, the retractor means includes a reel upon wich the belt strap is wound, the controlling means includes a lever means interposed between the mass and a toothed rim of the wheel, a detent means is provided on the lever means for engagement with the toothed rim, a feeler means is provided for scanning a diameter of the wound belt strap, the lever means and feeler means are arranged such that the feeler means releases the lever means upon a diameter of the belt strap reaching a predetermined diameter, a securing pin means is arranged in a lock housing of the safety belt system and extends through a mounting wall thereof, the lever means is provided with an extension portion adapted to lockingly engage the securing pin means when the mass is in the deflected position.

22. A sensor means according to any one of claims 1, 2, or 3, characterized in that the indicator means is incorporated into a belt strap of the safety belt system for providing an indication of a magnitude of a load on the belt strap occurring during a collision.

23. A sensor means according to any one of claims 8, 9 or 11, characterized in that the deformed tubular positioning means is arranged in the safety belt system for providing an indication of a magnitude of a load on a belt strap of the belt system occurring during a collision.

24. A sensor means according to claims 23, characterized in that the deformed tubular positioning means is arranged at the mounting point of the belt system.

25. A vehicle safety belt system comprising:
sensor means adapted to be triggered by deceleration forces, said sensor means including a mass deflectable from an initial position to a fully deflected position upon exceeding a predetermined amount of deceleration force,
and indicator means for providing an indication as to whether the belt of the safety belt system was deployed during an occurrence of the predetermined deceleration force, said indicator means including means for controlling the deflected mass in one of the initial position and the deflected position.

26. A system according to claim 25, wherein said mass is a liquid, and wherein said controlling means includes means for sealing the liquid in its deflected position in response to the predetermined deceleration force.

* * * * *